United States Patent

Shakesby

[15] 3,640,551

[45] Feb. 8, 1972

[54] COUPLING FOR PLASTIC PIPE

[72] Inventor: Leonard Shakesby, Alexandria, Ontario, Canada

[73] Assignee: Esso Research and Engineering Co.

[22] Filed: Oct. 1, 1970

[21] Appl. No.: 77,398

[52] U.S. Cl. .................................285/39, 285/343, 285/386
[51] Int. Cl. ......................................F16l 19/00, F16l 47/00
[58] Field of Search ..................285/343, 247, 334.4, 382.2, 285/382.1, 382, 386, 423, 39

[56] References Cited

UNITED STATES PATENTS

| 2,531,730 | 11/1950 | Henderson | 285/343 X |
|---|---|---|---|
| 3,295,870 | 1/1967 | Seablom | 285/343 X |
| 3,375,026 | 3/1968 | Szohatzky | 285/343 X |
| 3,429,593 | 2/1969 | Seablom | 285/343 X |

FOREIGN PATENTS OR APPLICATIONS

| 675,719 | 12/1963 | Canada | 285/247 |
|---|---|---|---|
| 911,036 | 11/1962 | Great Britain | 285/343 |
| 375,183 | 3/1964 | Switzerland | 285/343 |

*Primary Examiner*—Thomas F. Callaghan
*Attorney*—Manahan and Wohlers and F. Donald Paris

[57] ABSTRACT

A coupling for use in connecting lengths of plastic pipe comprising two parts threaded together, which have mismatched beveled annular mating surfaces. During the assembly of the coupling, the mismatched surfaces coact to force the coupling against the pipe, providing an effective joining of the pipe to the coupling.

5 Claims, 4 Drawing Figures

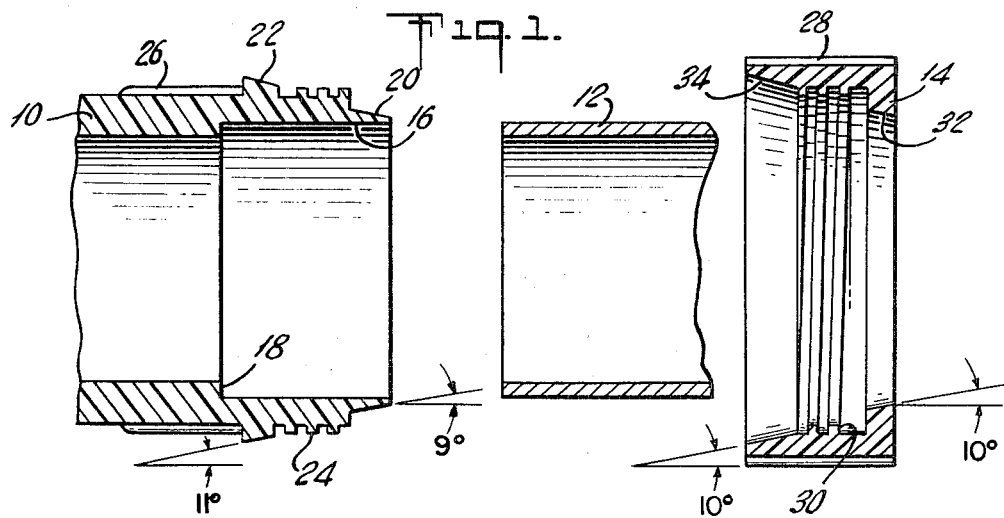
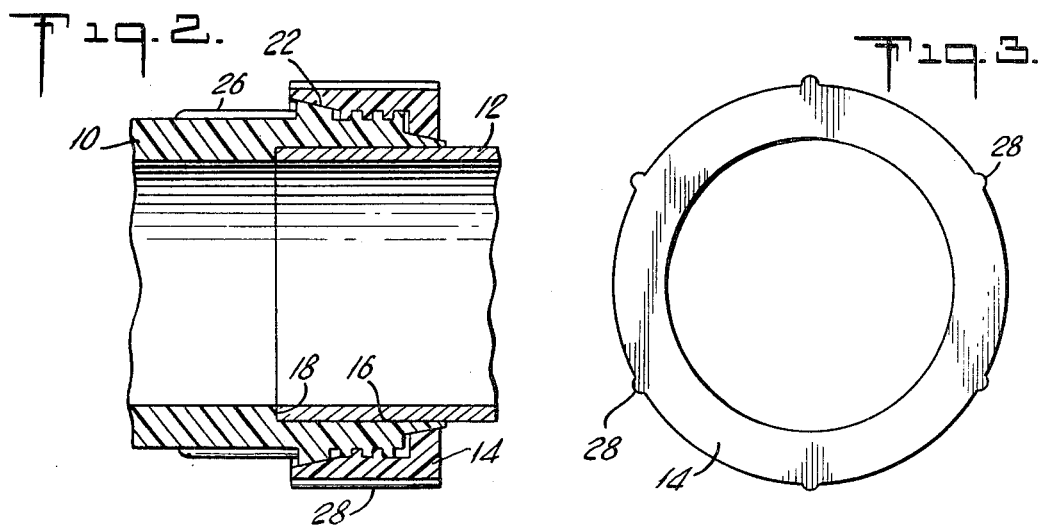
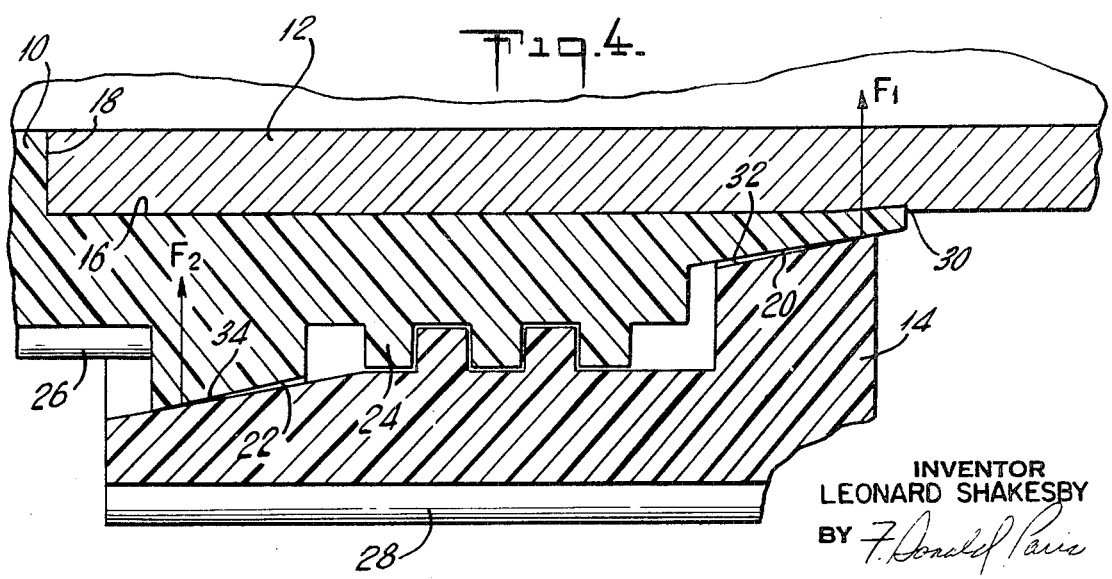
INVENTOR
LEONARD SHAKESBY
BY
ATTORNEY

COUPLING FOR PLASTIC PIPE

BACKGROUND OF THE INVENTION

The invention disclosed herein relates to a novel and improved coupling for pipe, and more particularly, to a coupling for substantially rigid plastic pipes made of materials such as polyethylene, polyvinyl chloride, and other suitable materials.

Heretofore, the joining of plastic pipe has presented a variety of difficult problems. While plastic pipes are essentially rigid, they retain a degree of flexibility, thus making it difficult for the coupling to grip the pipe firmly. If the pipe is not securely held within the coupling a leak is likely and complete failure of the joint is possible. The pipe's surface can be damaged by the action of the coupling and with couplings heretofore available it would be difficult to unmake and then remake the joint without cutting off the damaged portion of the pipe to expose new surfaces to the coupling.

Available prior art couplings have been found to have a serious deficiency in that due to high internal friction, they may fail to provide the necessary gripping action needed to provide a good joint. The design of prior art couplings has been such that the force one part of the coupling exerts upon the second part is uneven. Consequently, it has been found possible to lock the two parts of the joint together and achieve little or no gripping action. Thus, no seal is created and the joint is inoperative.

In plumbing, particularly in houses where it is not practicable to prefabricate before installations, the piping and fittings have to be installed by the "cut and try" method. In such installations a dismantleable coupling would be advantageous and would reduce the cost of installation.

SUMMARY OF THE INVENTION

The present invention overcomes the deficiencies of the couplings previously available by providing a novel and improved compression joint in which a positive gripping action is always obtained. The new coupling consists of two members, a cylindrical body and a locking nut. The body and the nut each have tapered surfaces disposed at an angle relative to the center line of the coupling. When the nut is threaded on the body, the tapered surfaces seat together. The force applied to the nut is translated by the tapered surfaces into a force acting perpendicularly to the pipe's centerline, thus creating a firm grip on the pipe. The novel feature of this coupling is that the tapered seating surfaces are intentionally made with dissimilar angles to provide only line contact. This assures that the force applied to the nut is fully translated into gripping action on the pipe rather than being wasted in locking the tapered surfaces together.

The threads could be located in various positions relative to the tapered surfaces, but in the preferred embodiment shown in the drawings, the threaded portion is located between two pairs of tapered surfaces.

Both parts of the coupling are provided with external lugs to permit the firm grip needed to assemble the coupling.

The cylindrical body is constructed to hold the pipe firmly in position with the inside diameter of the body being the same as that of the pipe. By providing a recessed section within the body having a diameter the same as the outside diameter of the pipe, a shoulder portion is formed. The pipe is inserted into the body of the coupling until the shoulder portion prevents it from going further. The locking nut, having been previously slid over the pipe, is threaded on the body until the force exerted on the pipe locks it firmly within the body.

The present invention has a primary object to provide a novel and improved pipe coupling in which a positive gripping action is always obtained.

A further objective of this invention is to provide a pipe coupling that may be loosened and then remade as required, while still retaining a positive gripping action.

Another objective is to provide a pipe coupling that cannot lock its two sections together without gripping the pipe.

BRIEF DESCRIPTION OF THE DRAWINGS

Having in mind the above summary and the objectives desired, reference to the drawings will show the essential features of the present invention.

FIG. 1 shows a coupling constructed according to the present invention in disassembled form.

FIG. 2 shows the coupling of FIG. 1 as assembled.

FIG. 3 shows an end view of the outer portion of the coupling taken as viewed from the right side of FIG. 2.

FIG. 4 shows an enlarged detail of the assembled joint of FIG. 2 illustrating the construction of the present invention.

DETAILED DESCRIPTION OF THE INVENTION

The pipe coupling comprises two parts, first, a cylindrical body member 10, which contains an annular shoulder portion 18, which serves as a seat for the pipe 12; external threads 24; a plurality of lugs for tightening, one of which is designated as 26; and two beveled annular surfaces 20 and 22, which have dissimilar angles with the centerline of the body, surface 20 having a smaller angle, preferably 9°, than that of surface 22, preferably 11°. The second part of the coupling is the locking nut comprising the body 14, a plurality of external lugs, one of which is shown as 28; internal threads 30, to mate with body threads 24; and to beveled annular surfaces 32 and 34, which have a common angle, preferably 10°, with the center line of the body, that angle being less than the angle of surface 22 and greater than the angle of surface 20.

The coupling, as shown assembled in FIG. 2, is produced by sliding the locking nut 14 over the pipe 12, inserting pipe 12 within the body member 10 until it is stopped by the annular shoulder 18, threading the locking nut 14 onto the body member 10 until the tapered surface 22 engages surface 34 and surface 20 engages surface 32.

Referring to FIG. 4, the dissimilar angles of the beveled surfaces 22, 20, 32 and 34 cause the surfaces to meet along two circumferential lines. The 9° angle of surface 20 and the 10° angle of surface 32 cause the surfaces to engage at a line, resulting in a force $F_1$ at the line of contact, directly toward the centerline of the pipe and cylindrical body. The 11° angle of surface 22 and the 10° angle of surface 34 cause the surfaces to engage at a line, resulting in a force $F_2$ at the line contact, directly toward the centerline of the pipe and cylindrical body. The forces $F_1$ and $F_2$ create a slight distortion of body member 10, particularly at point 30, causing the body member to grip the pipe securely. Such deformation of the body member 10, and the slight resiliency of pipe 12 form a positive seal and prevent slippage of the pipe 12 relative to the body member 10.

The coupling may be fabricated of numerous materials. In the preferred embodiment the locking nut would be made of a different and harder plastic than that used for the cylindrical body member.

The invention is not limited to the preferred embodiment as illustrated herein and described above. Different surface angles and other variations not shown or described may be utilized without departing from the essential features of the invention.

Having described the nature of the present invention, what is claimed is:

1. A coupling for joining rigid plastic pipe which comprises in combination:
    a. a cylindrical body member adapted to receive an end of said pipe and having an external threaded portion located between a first annular mating surface and a second annular mating surface, said mating surfaces having dissimilar angles relative to the centerline of the body member;
    b. a cylindrical locking nut operably associated with said body member, having an internal threaded portion formed between a third annular mating surface and a fourth annular mating surface, said mating surfaces of the locking nut having a common angle relative to the centerline of said nut, the common angle of the third and fourth mating surfaces of said locking nut being larger than the angle of the first mating surface of the body member but smaller than the angle of the second mating surface of the body member, said threaded portion and said mating surfaces being located on said locking nut so as to engage the corresponding threaded portion and mating surfaces located on said body member whereby when the locking nut is threaded onto the body member, the mating surfaces of said locking nut coact with the mating surfaces of said body member to force said body member into engagement with the plastic pipe.

2. The coupling of claim 1, wherein the dissimilar angles of the first and second annular mating surfaces of the body member are chosen so as to provide a circumferential line contact between said first and second annular mating surfaces of the body member and the third and fourth annular mating surfaces of the locking nut.

3. The coupling of claim 2, wherein:
   a. the annular mating surfaces of the body member have angles of 9° and 11° with the centerline of said body;
   b. the annular mating surfaces of the locking nut have a common angle of 10° with the centerline of said nut.

4. A coupling for use in joining rigid plastic pipe, which is comprised of, in combination:
   a. a cylindrical tapered body member having:
      1. an annular internal shoulder to receive the end of the pipe;
      2. a first external beveled annular surface located on the end of the body member and having an angle of 9° with the centerline of said body member;
      3. a second external beveled annular surface located beside and inwardly from said first annular surface having an angle of 11° with the centerline of said body member;
      4. an external threaded portion located between said first beveled surface and said second beveled surface.
   b. a cylindrical locking nut for engaging said body member having:
      1. two axially spaced beveled annular surfaces located internally of said nut, each of said surfaces having an angle of 10° with the centerline of the nut;
      2. threaded portion located internally of said nut between said two beveled surfaces so as to engage the threaded portion of the cylindrical body member when the body member and the locking nut are assembled.

5. The coupling of claim 4 wherein means are provided for gripping the coupling thereby facilitating the assembly of the body member and the locking nut.

* * * * *